(12) United States Patent
Rahman

(10) Patent No.: US 7,310,459 B1
(45) Date of Patent: Dec. 18, 2007

(54) ON-CHIP PROGRAMMABLE OPTICAL CROSSBAR SWITCH

(75) Inventor: Arifur Rahman, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 11/259,455

(22) Filed: Oct. 25, 2005

(51) Int. Cl.
*G02B 6/12* (2006.01)
*G02B 6/26* (2006.01)

(52) U.S. Cl. .......................................... 385/14; 385/50

(58) Field of Classification Search ................. None
See application file for complete search history.

(56) References Cited

U.S. PATENT DOCUMENTS

| | | | |
|---|---|---|---|
| 6,411,752 B1 * | 6/2002 | Little et al. ................. | 385/17 |
| 6,636,668 B1 * | 10/2003 | Al-hemyari et al. ........ | 385/40 |
| 6,665,476 B2 * | 12/2003 | Braun et al. ................ | 385/50 |
| 6,909,824 B1 * | 6/2005 | Messica et al. ............. | 385/30 |
| 7,031,563 B2 * | 4/2006 | Block et al. ................. | 385/15 |

OTHER PUBLICATIONS

Kobrinsky, Mauro J. et al., "On-Chip Optical interconnects", Intel Technology Journal, Optical Technologies and Applications, May 10, 2004, pp. 129-141, vol. 08, Issue 02, available from http://developer.intel.com/technology/itj/index.htm.

Barrios, Angulo C. et al., "Electrooptic Modulation of Silicon-On-Insulator Submicrometer-Size Waveguide Devices", IEEE Journal of Lightwave Technology, Oct. 2003, pp. 2332-2339, vol. 21, No. 10, available from IEEE Books, IEEE, 3 Park Avenue, 17th Floor, New York, NY 10016-5997.

Lipson, Michael, "Overcoming the Limitations of Microelectronics Using Si Nonophotonics: Solving the Coupling, Modulation and Switching Challenges", Nanotechnology, Institute of Physics Publishing, 2004, pp. S622-S627, vol. 15, available from Institute of Physics Publishing, Inc., The Public Ledger Building, Suite No. 929, 150 South Independence Mall West, Philadelphia, PA 19106 USA.

Miller D.A.B. et al., "Opportunities for Optics in Integrated Circuits Applications", IEEE International Solid-State Circuits Conference, Feb. 2005, pp. 86-87, Session 4, available from IEEE Books, IEEE, 3 Park Avenue, 17th Floor, New York, NY 10016-5997.

Liu, Ansheng et al., "Net Optical Gain in a Low Loss Silicon-On-Insulator Waveguide by Stimulated Raman Scattering", Optics Express, Sep. 6, 2004, pp. 4261-4268, vol. 12, No. 18, available from www.opticsexpress.org.

Rong, Haisheng et al., "A Continuous-Wave Raman Silicon Laser," Nature Publishing Group, Feb. 17, 2005, pp. 725-728, vol. 433, available from www.nature.com/nature.

* cited by examiner

*Primary Examiner*—Tina M Wong
(74) *Attorney, Agent, or Firm*—Scott Hewett

(57) ABSTRACT

An integrated circuit has an optical waveguide configured to carry a plurality of optical channels, which in a particular embodiment are optical clock signals generated by an optical clock generator. The integrated circuit includes an optical crossbar having a first output, a second output, a first optical ring resonator, and a second optical ring resonator. In a further embodiment, the optical crossbar is an optical crossbar switch and an output path in the optical crossbar switch includes another tunable optical ring resonator and an intermediate waveguide, which allows isolating the output from any optical channel on the on-chip optical waveguide by tuning the first ring resonator to a first wavelength, and tuning the other ring resonator to another wavelength.

18 Claims, 4 Drawing Sheets

ON-CHIP PROGRAMMABLE OPTICAL CROSSBAR SWITCH

FIELD OF THE INVENTION

The present invention relates generally to semiconductor devices, and more particularly to integrated opto-electronic circuits.

BACKGROUND OF THE INVENTION

Integrated circuits ("ICs") are typically fabricated on a substrate ("wafer") of silicon or other semiconductor material. The substrate includes many ICs, which are separated into individual dies ("chips"). Modern ICs have many layers of patterned metallization, and millions of individual electronic devices, such as transistors, on each chip. Electrical interconnections between the devices and between functional blocks on the chip are made using metal traces and vias. However, as the dimensions of the patterned metal interconnections shrink, resistance-per-length increases, which increases delay and power consumption. Other problems, such as cross-coupling and electromagnetic interference ("EMI") also arise.

One approach to remedy delay, or latency, is to more closely space electronic repeaters along an interconnect line. This is undesirable because repeaters take up area on the chip and consume additional power. Repeaters also make it more difficult to route signal lines.

Optical signaling has been proposed as an alternative to electrical interconnections for use in ICs. A basic optical signaling system is described in *On-Chip Optical Interconnects* by Kobrinsky et al., INTEL TECHNOLOGY JOURNAL, v. 8, issue 2 (May 10, 2004), the disclosure of which is hereby incorporated by reference in its entirety for all purposes. Optical signal networks can provide high-bandwidth, low-latency interconnects that are relatively immune to EMI. However, conventional on-chip optical signal networks were found to not reveal significant advantages over copper-based networks because certain optical components are not available for incorporation into a CMOS IC.

It is desirable to provide optical components for use in a CMOS IC that provides advantageous use of an on-chip optical network.

SUMMARY OF THE INVENTION

An integrated circuit has an optical waveguide configured to carry a plurality of optical channels ($\lambda 1$, $\lambda 2$), which in a particular embodiment are optical signals, such as optical clock signals, global signal, synchronization signal, bus signal, or data signals. The integrated circuit includes an optical crossbar having a first output, a second output, a first optical ring resonator, and a second optical ring resonator. In a further embodiment, the optical crossbar is an optical crossbar switch and an output path in the optical crossbar switch includes another tunable optical ring resonator and an intermediate waveguide, which allows isolating the output from any optical channel on the on-chip optical waveguide by tuning the first ring resonator to a first wavelength, and tuning the other ring resonator to another wavelength. In a further embodiment, the intermediate waveguide provides optical gain to the selected optical channel.

DETAILED DESCRIPTION OF THE DRAWINGS

I. An Exemplary IC with On-Chip Optical Network

Figure 1A:
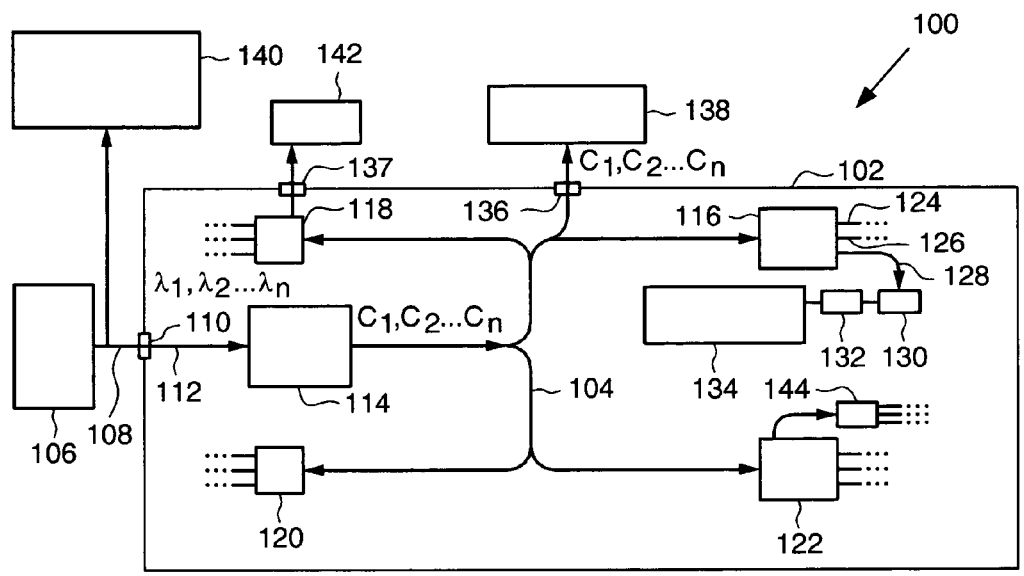
FIG. 1A is a diagram of a system with an IC using an on-chip optical network according to an embodiment of the invention.

FIG. 1 is a diagram of a system 100 with an IC 102 using an on-chip optical distribution network 104 according to an embodiment of the invention. In a particular embodiment, the IC 102 is a CMOS IC, and in a more particular embodiment is an FPGA.

An optical source 106 generates a number of wavelengths $\lambda 1, \lambda 2, \ldots, \lambda n$ of light, which will be referred to as "optical channels" for purposes of convenient discussion, and routes the optical channels to the IC 102 via an optical waveguide 108, such as an optical fiber. Alternatively, an on-chip optical source generates multiple wavelengths. An on-chip optical source may produce multiple optical signals, or may produce a broad-band optical signal that is divided into optical channels using optical filters. Multiple optical channels (wavelengths) carried on a common optical waveguide uses a technique commonly referred to as wavelength-division multiplexing ("WDM"). An optical interface 110 on the IC 102 couples the optical channels from the optical waveguide 108 to an on-chip optical waveguide 112. On-chip optical waveguides are discussed in *Electrooptic Modulation of Silicon-on-Insulator Submicrometer-Size Waveguide Devices*, by Barrios et al., JOURNAL OF LIGHTWAVE TECHNOLOGY, Vol. 12, No. 10, 2332-39 (Oct. 2003), the disclosure of which is hereby incorporated by reference in its entirety for all purposes.

In a particular embodiment, the optical channels are provided to an optical clock generator 114. The optical clock generator modulates the optical channels to produce optical clock signals (see FIG. 4 and associated description). In a particular embodiment, the optical channels are modulated using electrooptic techniques. The clock signals C1, C2, ..., Cn are routed to one or more optical crossbar switches 116, 118, 120, 122. Alternatively, an on-chip optical modulator produces other types of signals, such as global control signals, synchronization signals, global bus signals and/or data signals. In yet another embodiment, one or more of the optical channels are modulated off-chip. In a particular embodiment, the IC does not include an optical modulator and modulated optical channels are provided to the IC.

It is particularly desirable to use optical clock signals in an FPGA for several reasons. An FPGA is configurable for use in a variety of customer-selected applications. A number of independently programmable clock networks is provided to accommodate the customer's needs. For example, in a VIRTEX-4™ FPGA, available from Xilinx, Inc. of San Jose, Calif., thirty-two independently programmable clock networks are provided. Each clock network dissipates a significant amount of dynamic power, and in some cases all clock networks may account for about 15% to about 20% of the total power in a typical FPGA application, and about 30% in a microprocessor application. Customers often use multiple clocks in their design, and buffers are inserted to ensure sharp rise/fall times in a clock network of an FPGA. These buffers take up additional area and dissipate additional power.

Furthermore, as power supply voltage is reduced, the signal-to-noise margin worsens. Differential signaling is often used to improve signal integrity, resulting in area overhead and additional design complexity. Using an optical clock network in an FPGA, rather than several clock distribution networks, allows many clock signals to be carried on the same optical network, and avoids the dynamic power consumption associated with conventional clock networks.

The optical crossbar switches 116, 118, 120, 122 illustrated in this example are what are commonly known as 1×3 crossbar switches because each has a single input (the optical distribution network 104) and three outputs (e.g., 124, 126, 128). In an embodiment where three optical clock signals are produced, any one of the three optical clock signals may be selectively routed to any one of the three outputs 124, 126, 128 of the optical crossbar switch 116. Routing is controlled by a control signal(s), as further discussed in relation to FIG. 2.

An optical clock signal (e.g., C1) is present on the output 128 of the optical crossbar switch 116. The optical clock signal is coupled to an optical detector 130, such as a photodiode or phototransistor, which converts the optical clock signal into an electrical clock signal. In a particular embodiment, a trans-impedance amplifier ("TIA") 132 buffers the electrical clock signal, which is then provided to a block 134 of the IC 102. In some embodiments, the block is one or more functional blocks, such as a logic block, a memory block, or a transceiver block of an FPGA. Functional blocks of FPGAs are further discussed in relation to FIG. 5. Alternatively, the block is a physical block (i.e., a region of the IC) that includes many functional blocks.

Converting the optical clock signal to an electrical clock signal provides a local clock signal to the block. The optical clock signal that is provided to the block provides signal integrity (i.e., no cross talk) with low loss, low latency, and consumes less power than a conventional electrical clock distribution network. The optical clock distribution network 104 provides wide bandwidth suitable for carrying multiple optical clock signals. In an alternative embodiment, one or more optical detectors are incorporated into an optical crossbar switch so as to provide an electrical clock signal or other electrical output at one or more of the outputs.

These features make using an optical clock system particularly desirable in an FPGA. FPGAs are physically large devices, and low loss optical transmission provides a technique for distributing a clock signal across relatively long distances. Similarly, the latency of the clock signal does not appreciably change over the long distances encountered in an FPGA. This allows more precise timing and greater design flexibility. Design flexibility is particularly important in an FPGA because a user configures the FPGA for his desired application. The manufacturer of the FPGA has to account for a range of user applications. Different blocks often use different clock signals, and the clock signal used by a block may change during use. Thus, providing a number of WDM optical clock signals on the optical network that can be selectively coupled to a block is particularly desirable in FPGAs.

In a further application, a second optical interface 136 is provided to couple the optical clock signals C1, C2, . . . , Cn to a second IC 138. Such a system is desirable to synchronize the IC 102 with the second IC 138. Similarly, the optical signal(s) may be routed through an optical crossbar switch 118 through an optical interface 137 to another IC 142 or other optical device, or may be routed through an optical crossbar switch 122 to another optical crossbar switch 144. The optical signal is not slowed by the variations in resistive, capacitive and inductive effects in different clock distribution paths that can cause skew in electrical clock systems. In yet a further embodiment, the optical channels generated by the optical source 106 are provided to a third IC 140.

An optical clock distribution network in an FPGA also provides opportunities for improvement in jitter. As discussed above, clock signals in an FPGA are often buffered, and may be buffered several times in a clock distribution path. Each buffer can add jitter, such as jitter caused by time variations in power supply voltage, which is additive. Jitter is a variation of clock edge timing, and can cause timing uncertainty. An optical clock network does not use electronic digital buffers, and thus avoids jitter from these sources.

Figure 1B:
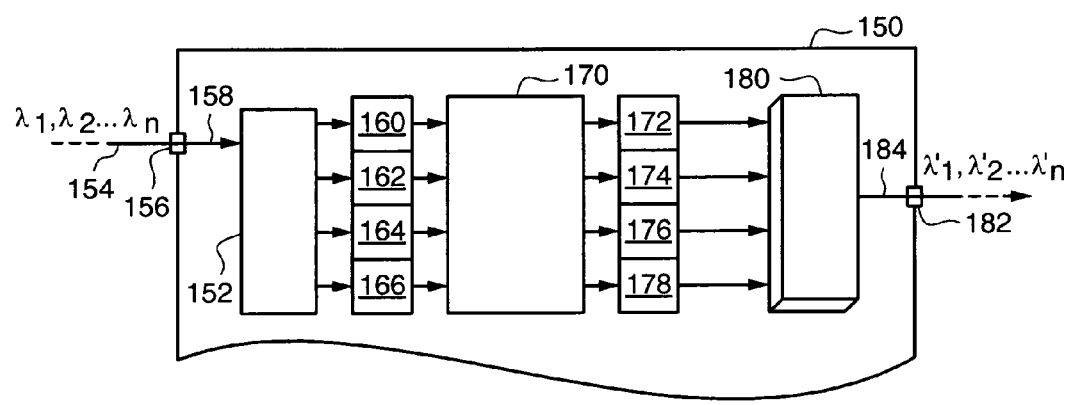
FIG. 1B is a diagram of a portion of a field-programmable gate array ("FPGA") with an optical crossbar switch and transceivers according to an embodiment of the invention.

FIG. 1B is a diagram of a portion of a field-programmable gate array ("FPGA") 150 with an optical crossbar switch 152 and transceivers according to an embodiment of the invention. Optical signals $\lambda 1, \lambda 2, \ldots, \lambda n$ are provided on an optical waveguide 154 to the FPGA 150 through an optical interface 156, and are coupled to the optical crossbar switch 152 via an on-chip optical waveguide 158. The optical crossbar switch 152 routes signals to receivers 160, 162, 164, 166. In a particular embodiment, the receivers are configured from multi-gigabit transceivers ("MGTs") of the FPGA 150. The optical crossbar switch 152 converts the optical signals to electrical signals, so that the electrical signals are coupled to the receivers. Alternatively, the optical crossbar switch routes optical signals to receivers capable of converting the optical signal to an electronic signal (e.g., having a photodetector and TIA), or to an intermediate component (not shown) that converts the optical signal(s) to an electrical signal(s), which is coupled to the receiver(s).

The outputs of the receivers 160, 162, 164, 166 are coupled to the fabric 170 of the FPGA 150. The fabric is generally configurable to provide a wide variety of functions, as is known in the art of FPGAs having MGTs. The fabric 170 provides control and data signals to transmitters 172, 174, 176, 178, which in a particular embodiment are configured from MGTs of the FPGA 150. The transmitters 172, 174, 176, 178 drive an optical source 180, such as a multiple quantum well laser device. The optical source 180 is a die, such as a flip-chip die, mounted on the silicon chip of the FPGA 150 to form a hybrid microcircuit. The optical source produces a number of optical signals $\lambda 1', \lambda 2', \ldots \lambda 3'$, that are coupled to a second optical interface 182 via a second on-chip optical waveguide 184. The optical signals produced by the optical source are at similar or different wavelengths from the optical signals provided on the optical waveguide 154. Alternatively, an optical source is embedded in the silicon chip of the FPGA. In yet another embodiment, the control signals from the transmitters are provided to an off-chip (i.e., off of the FPGA) optical source.

II. An Exemplary IC with Optical Crossbar Switch

Figure 2:
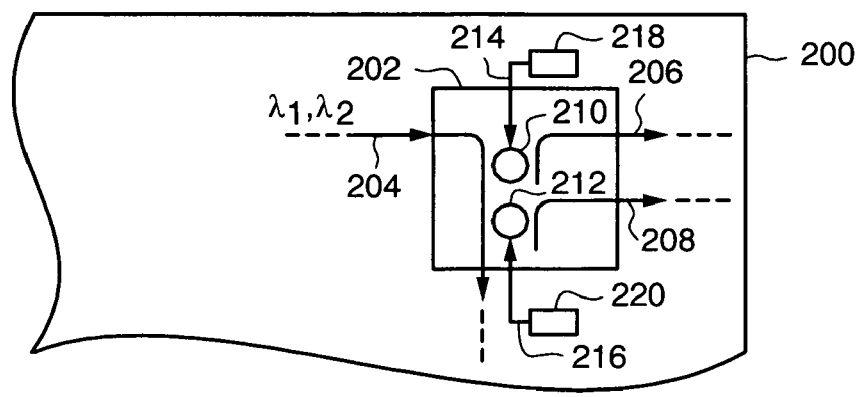
FIG. 2 is a diagram of a portion of an IC with a 1×2 optical crossbar switch according to an embodiment of the present invention.

FIG. 2 is a diagram of a portion of an IC 200 with a 1×2 optical crossbar switch 202 according to an embodiment of the present invention. In a particular embodiment, the IC is a CMOS IC, and in a more particular embodiment is an FPGA. An on-chip optical waveguide 204 provides optical channels λ1, λ2 to the optical crossbar switch 202. In a particular embodiment, the optical channels are optical clock signals. Alternatively, they are other optical signals, such as global control signals, global busses, and/or data signals. A feature of the optical distribution network with optical crossbar switches is that different types of optical signals (e.g., an optical clock signal and a global control signal) may be distributed on the same network, and separated (i.e., routed) at the optical crossbar switch. The optical crossbar switch 202 has two output optical waveguides 206, 208 that are optically coupled to the on-chip optical waveguide 204 with tunable optical ring resonators 210, 212. In a particular embodiment, the optical ring resonators are tunable ring resonators and the wavelengths are selectively coupled to various selected output ports.

Alternatively, the optical ring resonators are fixed optical ring resonators. That is, their coupling wavelength is not tuned. An on-chip optical modulator (see FIG. 1A, ref. num. 114) in an FPGA or other IC may produce various selected clock signals on the optical channels according to the application (user configuration) of the FPGA. In some embodiments, an optical crossbar switch according to embodiments includes both fixed and tunable optical ring resonators. Other embodiments of optical cross bar switches include only fixed optical ring resonators, and yet other embodiments include only tunable optical ring resonators.

Tunable optical ring resonators couple optical energy at a selected wavelength (i.e., λ1 or λ2) according to a tune signal provided on a control line 214, 216 from a tune control circuit 218, 220. Two separate tune control circuits are illustrated, but a single tune control circuit providing multiple tune control signals is alternatively used. In a particular embodiment, the tune control circuit is a CMOS circuit, which is particularly desirable for incorporation in an FPGA. Optical ring resonators and their operation are described in *Overcoming the Limitations of Microelectronics Using Si Nanophotonics: Solving the Coupling, Modulation and Switching Challenges*, by Michal (sic) Lipson, INSTITUTE OF PHYSICS PUBLISHING, Nanotechnology 15, S622-27 (2004), the disclosure of which is hereby incorporated by reference in its entirety for all purposes.

In one embodiment, the optical ring resonators are tuned using a free carrier dispersion effect. Alternatively, the optical ring resonators are tuned using a thermooptic effect. Thermooptic effects are generally disfavored for modulating optical signals in on-chip optical waveguides because they are limited to modulation frequencies of about 1 MHz. However, for switching speeds less than about 1 MHz thermooptic techniques are useful for operation of a tunable optical ring resonator in an on-chip optical crossbar switch. The diameter of the optical ring resonator is typically on the order of about 10 microns, depending on the wavelengths to be switched, the materials used, and other well-known factors.

Tunable ring resonators are particularly desirable for use in an on-chip optical crossbar switch because a small change in the index of refraction in the ring may detune the resonance, which is relatively high-Q, and typically about 2-3 orders of magnitude higher than conventional L-C resonators. For example, in a 10-micron ring resonator, which resonates at a nominal wavelength of about 1550 nm in a particular embodiment, an index change as small as $10^{-3}$ may tune the resonance by 1 nm. Thus, for optical channels spaced 100 GHz (about 0.8 nm λ at nominally 1550 nm) apart, an index change less than $10^{-3}$ switches the output signal on the output optical waveguide 206 between λ1 and λ2. Similarly, the output optical waveguide 208 may be switched between λ1 and λ2. The optical crossbar switch allows either optical channel to be present on both outputs, or different optical channels to be present on the outputs. In the event that it is desirable to have no optical channel on an output, the associated ring resonator is simply tuned to a wavelength not present on the on-chip optical waveguide. In this embodiment, the optical waveguide 204 continues through the optical crossbar switch 202 and may provide the optical channels to additional components on the IC 200 or to other ICs or off-chip optical components. Alternatively, the optical waveguide is terminated in the optical crossbar switch (see FIG. 3).

Generally, the ring resonator is designed according to its dimensions, materials, and other factors to provide a tuning range over the wavelength range of the intended optical channels. For example, if a 1×4 optical crossbar was intended to switch between four optical channels at 100 GHz spacing, a tuning range of at least 400 GHz (about 3.2 nm) is desired, which corresponds to a change in refractive index of about $4\times10^{-3}$. If a 50 GHz channel spacing was used, only about $2\times10^{-3}$ change in refractive index would be needed to tune over four optical channels, or alternatively, the optical ring resonator could be tuned over 8 optical channels with a refractive index change of about $4\times10^{-3}$. These numbers are merely exemplary for illustrating the operation of the optical crossbar switch. Different nominal wavelengths and channel spacings are used in alternative embodiments. For example, a nominal wavelength of about 50 nm, about 200 nm or about 800 nm are used in other embodiments. Embodiments operating at nominally 1550 nm are desirable when using off-chip sources because of the variety of available optical components designed to work at these wavelengths. In other embodiments, compound semiconductor devices, such as III-V semiconductor devices are integrated in silicon-based ICs, either by bonding to form a hybrid IC, or by incorporating a compound semiconductor region into the silicon die, such as by selective epitaxial growth.

III. An Exemplary Dual-Resonator Optical Crossbar Switch

Figure 3:
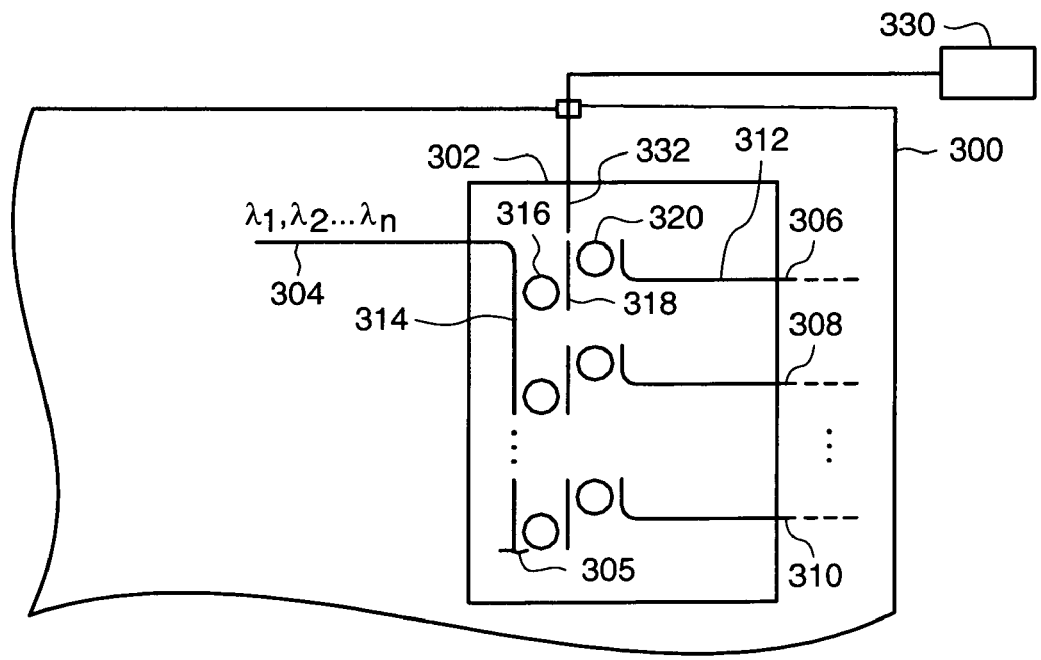
FIG. 3 is a diagram of a portion of an IC with a 1×N optical crossbar switch according to an embodiment of the invention.

FIG. 3 is a diagram of a portion of an IC 300 with a 1×N optical crossbar switch 302 according to an embodiment of the invention. The optical crossbar switch 302 is coupled to an on-chip optical input waveguide 304 that provides optical channels λ1, λ2, . . . , λn. The on-chip optical input waveguide ends in a termination 305. Alternatively, the on-chip optical input waveguide continues through the optical crossbar switch to additional on-chip or off-chip optical components (see, e.g., FIG. 2).

The optical crossbar switch 302 is optically coupled to a number of optical output waveguides 306, 308, 310. In a particular embodiment, the number of optical output waveguides is the same as the number of optical channels provided on the on-chip optical input waveguide 304. Alternatively, the number of optical outputs of the optical crossbar switch is fewer than the number of optical channels carried on the on-chip optical input waveguide, whether the on-chip optical input waveguide terminates in the optical crossbar switch or continues through it. The terms "input" and "output" are used solely for purposes of convenient discussion. Those of skill in the art of optical networks appreciate that channels may be added to the on-chip waveguide 304 through the optical crossbar switch.

An optical output 312 is optically coupled to an input optical waveguide 314 of the optical crossbar switch 302 through a first optical ring resonator 316 an intermediate waveguide 318, and a second optical ring resonator 320. The first and second optical ring resonators 316, 320 are independently controllable so that the output 312 may be shut off by tuning the first and second optical ring resonators to different wavelengths. In other words, the output may be isolated from any optical channel carried on the on-chip optical waveguide. The control lines and associated circuits are omitted for simplicity and clarity of illustration (see FIG. 2, ref. nums. 214, 216, 218, 220).

For example, if the first optical ring resonator is tuned to $\lambda 1$ and the second optical ring resonator 320 is tuned to $\lambda 1$, then $\lambda 1$ is coupled from the input waveguide 314 through the first optical ring resonator 316, the intermediate waveguide 318, and second optical ring resonator 320 to the output 312, or vice versa. If either the first or second ring resonator is tuned to a wavelength other than $\lambda 1$ (e.g., $\lambda 2$), then $\lambda 1$ will not be coupled to the output. Optical isolation between the input waveguide 314 and the output 312 of the optical crossbar switch at $\lambda 1$ may also be achieved by tuning both the first and second optical ring resonators to a wavelength other than $\lambda 1$. Using dual optical ring resonators and an intermediate waveguide allows isolation of the output from the input while the entire tuning range of the ring resonators is available for signal coupling.

In a particular embodiment, the first optical ring resonator has the nominal design wavelength and tuning range as the second optical ring resonator. Alternatively, the optical ring resonators in an output path have different nominal design wavelengths and/or tuning ranges, as long as the tuning ranges of the two optical ring resonators are sufficient to couple all the intended optical channels.

Comparing the single optical ring resonator configuration of FIG. 2, isolation between the input and output occurs when the optical ring resonator is tuned off of any optical channel. However, if the range of wavelengths carried on the optical input is equal to or greater than the tuning range of the single ring resonator, then it might not be possible to tune the resonator so that the output is completely tuned off. For example, if an optical ring resonator is tuned to an inter-channel wavelength (i.e., a wavelength that is normally provided for channel separation to avoid optical interference between adjacent channels), the isolation might not be as complete as if the single ring resonator were tuned to a wavelength far away from any optical channel, or if a two-resonator path were used.

In an embodiment where the input waveguide carries more channels than the optical crossbar switch has outputs, a two-resonator coupling path allows full use of the tuning range of the optical isolators in the optical crossbar switch. In a particular embodiment, all the optical ring resonators in the optical crossbar switch have the same nominal design wavelength (e.g., have the same dimensions); however, alternative embodiments include optical ring resonators having different nominal design wavelengths in a single optical crossbar switch.

Similarly, an alternative embodiment has one or more single optical ring resonator optical output paths combined with one or more optical output paths having two optical ring resonators, such as when one or more of the optical outputs has particularly critical isolation requirements, but other outputs have relaxed isolation requirements. In a particular embodiment, each of the optical outputs of an optical crossbar switch may couple each of the optical channels provided on the on-chip optical input waveguide. Alternatively, each of the optical outputs of an optical crossbar switch may couple each of a subset of the optical channels provided on the on-chip optical waveguide. In another embodiment, one or more of the optical outputs of an optical crossbar switch may couple a first subset of the optical channels provided on the on-chip optical input waveguide, and a second or more of the optical outputs of the optical crossbar switch may couple a second subset of the optical channels provided on the on-chip optical input waveguide.

Optionally, light from an optical pump source 330 is provided to a coupling waveguide 332 that injects light into the intermediate waveguide(s) 318 to provide optical gain. In a particular embodiment, the optical pump source provides short pulses of high-power light. The pulse width is narrower that the carrier recombination life time in the silicon-insulator waveguide, and reduces the free carrier generation rate due to two-photon absorption in the silicon. Alternatively, an optical pump source die is mounted on the FPGA chip to form a hybrid microcircuit wherein the optical pump source die illuminates the desired intermediate waveguides. Optical gain techniques are further described in *A Continuous-Wave Raman Silicon Laser* by Haisheng Rong et al., NATURE, Vol. 433, 725-28 (February 2005) and in *Net Optical Gain in a Los Loss Silicon-On-Insulator Waveguide by Stimulated Raman Scattering* by Ansheng Liu et al., OPTIC EXPRESS, Vol. 12, No. 18, 4261-68 (Sep. 6, 2004), the disclosures of which are both incorporated in their entirety by reference for all purposes.

IV. Exemplary Optical Clock Signals

Figure 4:
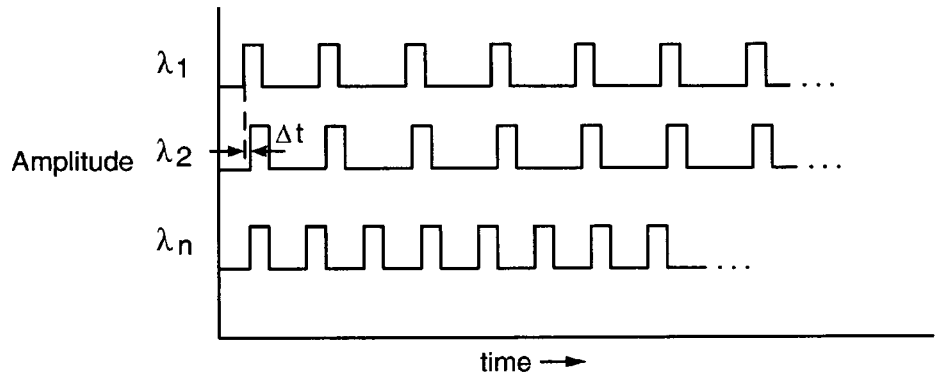
FIG. 4 is a timing diagram illustrating clock signals of an on-chip optical clock system according to an embodiment of the invention.

FIG. 4 is a timing diagram illustrating clock signals of an on-chip optical clock system according to an embodiment of the invention. A first optical clock signal $\lambda 1$ is phase-shifted from a second optical clock signal $\lambda 2$ by a selected time $\Delta t$. A third optical clock signal $\lambda 3$ has a different period than the first and second optical clock signals. Each of these optical clock signals is carried on a different wavelength, similar to optical channels used in optical telecommunication networks, and on a common waveguide. In a particular embodiment, the optical clock signals are generated by an optical clock generation circuit in an FPGA (see FIG. 1, ref. num. 114).

V. An Exemplary IC

Programmable logic devices (PLDs) are a well-known type of integrated circuit that can be programmed to perform specified logic functions. One type of PLD, the field programmable gate array (FPGA), typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output (I/O) resources by an interconnect switch matrix. Each function block of the CPLD includes a two-level AND/OR structure similar to those used in Programmable Logic Arrays (PLAs) and Programmable Array Logic (PAL) devices. In some CPLDs, configuration data is stored on-chip in non-volatile memory. In other CPLDs, configuration data is stored on-chip in non-volatile memory, then downloaded to volatile memory as part of an initial configuration sequence.

For all of these programmable logic devices (PLDs), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable.

ICs use various sorts of devices to create logic circuits. Many types of ICs use complementary metal-oxide-semiconductor ("CMOS") logic circuits. CMOS logic circuits use CMOS cells that have a first-conductivity-type metal-oxide-semiconductor ("MOS") transistor (e.g., a p-type MOS ("PMOS") transistor) paired with a second-conductivity-type MOS transistor (e.g., an n-type MOS ("NMOS") transistor). CMOS cells can hold a logic state while drawing only very small amounts of current.

Figure 5:
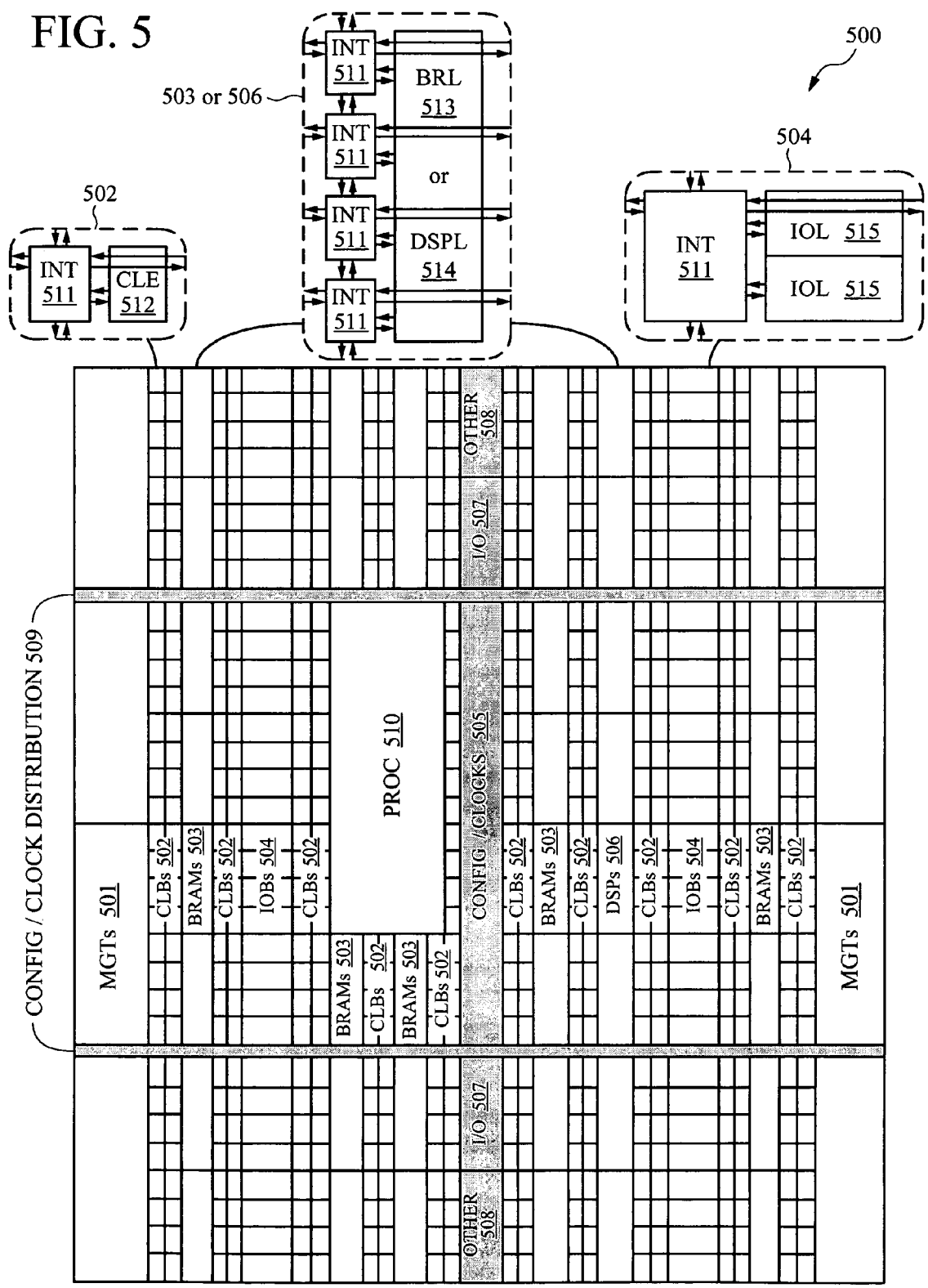
FIG. 5 is a diagram of an FPGA with an on-chip optical clock system according to an embodiment of the invention.

FIG. 5 is a diagram of an FPGA 500 with an on-chip optical clock system according to an embodiment of the invention. The FPGA is an integrated circuit that includes CMOS portions in several of the functional blocks, such as in RAM and logic, and is fabricated using a CMOS fabrication process. An optical crossbar switch according to an embodiment(s) of the invention is incorporated into any of several functional blocks. In a particular embodiment, an optical clock system is used in the FPGA and optical crossbar switches are used to distribute optical clock signals to local clock generators and local clock distribution circuits.

Providing an optical clock system with optical crossbars is particularly desirable in FPGAs for at least two reasons. First, different users often have different clock and timing requirements. The performance advantages provided by an optical clock system are more advantageous in an FPGA because of the operating flexibility of FPGAs. For example, an FPGA may have a receiver configured by the user to work in cooperation with an off-chip transmitter defined by the user. An optical clock system improves timing between the user-defined transmitter and receiver, reducing clock error and enhancing speed and accuracy because more of each cycle is valid for data transfer.

In FPGAs having multiple programmable clocks, an optical clock system may consolidate many clock signals on a single optical network, avoiding the high dynamic power used by many clocks systems toggling at a 100% activity factor. Optical signal integrity may be maintained, even at low $V_{DD}$, which avoids the area overhead used for differential signaling and buffering in electronic clock systems operating at low $V_{DD}$. By avoiding the electronic buffering, worst case jitter is reduced, providing improved application design margins.

The FPGA architecture includes a large number of different programmable tiles including multi-gigabit transceivers (MGTs 501), configurable logic blocks (CLBs 502), random access memory blocks (BRAMs 503), input/output blocks (IOBs 504), configuration and clocking logic (CONFIG/CLOCKS 505), digital signal processing blocks (DSPs 506), specialized input/output blocks (I/O 507) (e.g., configuration ports and clock ports), and other programmable logic 508 such as digital clock managers, analog-to-digital converters, system monitoring logic, and so forth. Some FPGAs also include one or more dedicated processor blocks (PROC 510).

In some FPGAs, each programmable tile includes a programmable interconnect element (INT 511) having standardized connections to and from a corresponding interconnect element in each adjacent tile. Therefore, the programmable interconnect elements taken together implement the programmable interconnect structure for the illustrated FPGA. The programmable interconnect element (INT 511) also includes the connections to and from the programmable logic element within the same tile, as shown by the examples included at the top of FIG. 5.

For example, a CLB 502 can include a configurable logic element (CLE 512) that can be programmed to implement user logic plus a single programmable interconnect element (INT 511). A BRAM 503 can include a BRAM logic element (BRL 513) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 506 can include a DSP logic element (DSPL 514) in addition to an appropriate number of programmable interconnect elements. An IOB 504 can include, for example, two instances of an input/output logic element (IOL 515) in addition to one instance of the programmable interconnect element (INT 511). As will be clear to those of skill in the art, the actual I/O pads connected, for example, to the I/O logic element 515 are manufactured using metal layered above the various illustrated logic blocks, and typically are not confined to the area of the input/output logic element 515. In the pictured embodiment, a columnar area near the center of the die (shown shaded in FIG. 5) is used for configuration, clock, and other control logic. Configuration, clock, and other control signals may be distributed by a configuration/clock distribution network 509 (shown as shaded horizontal sections). In some embodiments, the distribution network 509 may include an optical network, which may have one or more optical crossbar switches, as described herein.

Some FPGAs utilizing the architecture illustrated in FIG. 5 include additional logic blocks that disrupt the regular columnar structure making up a large part of the FPGA. The additional logic blocks can be programmable blocks and/or dedicated logic. For example, the processor block PROC 510 shown in FIG. 5 spans several columns of CLBs and BRAMs.

Note that FIG. 5 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 5 are purely exemplary. For example, in an actual FPGA more than one adjacent column of CLBs is typically included wherever the CLBs appear, to facilitate the efficient implementation of user logic.

VI. An Exemplary Method of Operating an Optical Crossbar Switch

Figure 6:
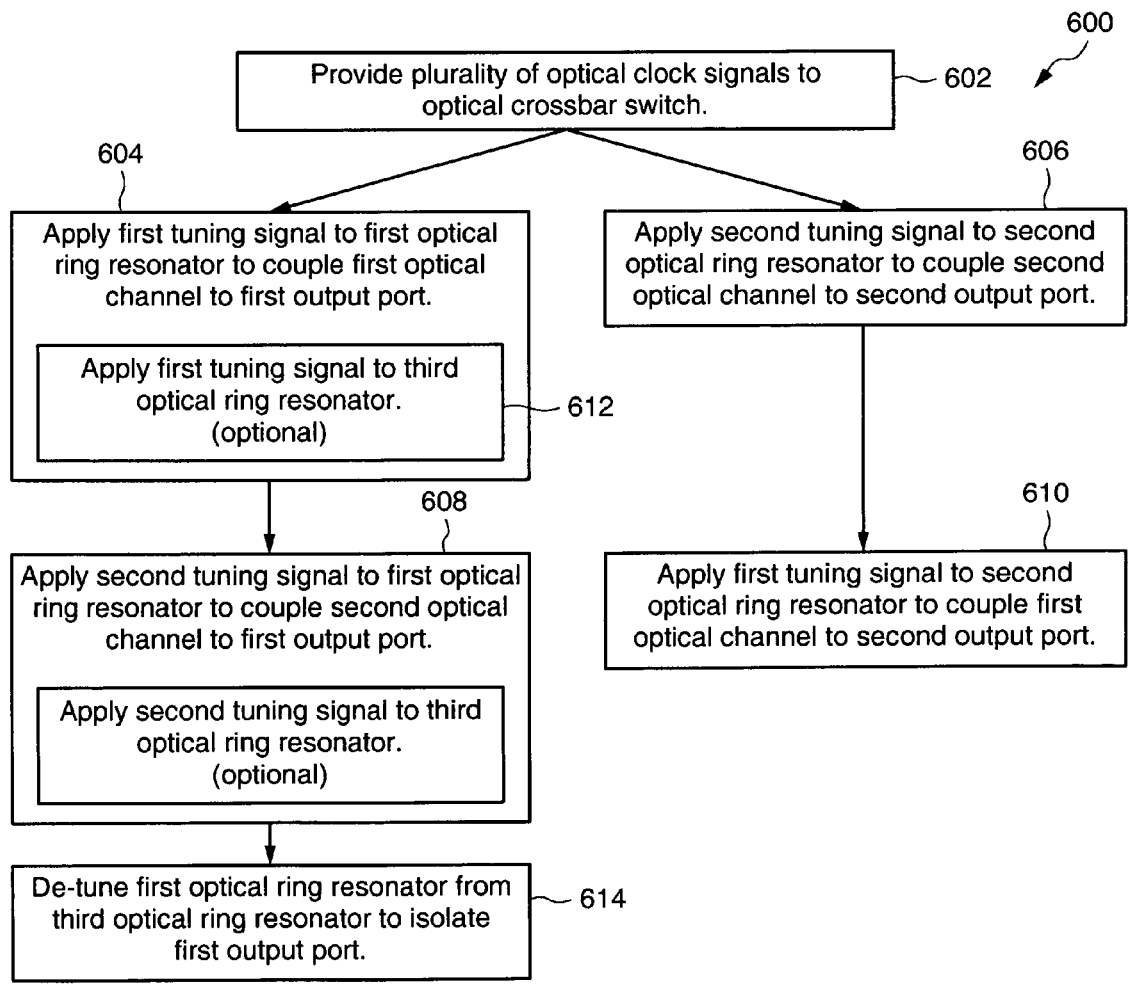
FIG. 6 is a flow chart of a method of routing optical channels through an optical crossbar switch integrated on a CMOS IC according to an embodiment of the invention.

FIG. 6 is a flow chart of a method of routing optical channels through an optical crossbar switch integrated on a CMOS IC 600 according to an embodiment of the invention. A plurality of optical clock signals at a plurality of wavelengths is provided on an on-chip optical waveguide to the optical crossbar switch (step 602). A first tuning signal is applied to a first optical ring resonator so as to couple a first wavelength having a first optical clock signal from the on-chip optical waveguide to a first optical output port of the optical crossbar switch (step 604) and a second tuning signal is applied to a second optical ring resonator so as to couple a second wavelength having a second optical clock signal from the on-chip optical waveguide to a second optical output port of the optical crossbar switch (step 606). In a particular embodiment, the first and second tuning signals are applied essentially concurrently.

In a further embodiment, the first tuning signal is applied to the second optical ring resonator so as to couple the first wavelength to the second output port (step 608). In a yet further embodiment, the second tuning signal is applied to the first optical ring resonator as to couple the second wavelength to the first output port (step 610).

In a yet further embodiment, during the step of applying the first tuning signal to the first optical ring resonator so as to couple a first wavelength having a first optical clock signal from the on-chip optical waveguide to a first optical output port of the optical crossbar switch, the first tuning signal is also concurrently applied to a third optical ring resonator so as to couple the first wavelength through the first optical ring resonator and through the third optical ring resonator (step 612). In an alternative embodiment, the first and third tunable optical ring resonators are substantially the same, a tuning signal is applied to the first optical ring resonator and a different tuning signal is applied to the third optical ring resonator so that no wavelength is coupled from the on-chip optical waveguide to the first output port of the optical crossbar switch (step 614).

While the present invention has been described in connection with specific embodiments, variations of these embodiments will be obvious to those of ordinary skill in the art. For example, other materials may be used for the on-chip optical waveguides and optical ring resonators, or other control schemes and signal routing may be followed. Therefore, the spirit and scope of the appended claims should not be limited to the foregoing description.

I claim:

1. An integrated circuit comprising:
   an on-chip optical waveguide configured to carry a plurality of optical channels;
   a first output selectively coupling a first optical channel through
      a first optical ring resonator,
      an intermediate waveguide, and
      a second optical ring resonator to the on-chip optical waveguide, the intermediate waveguide being disposed between the first optical ring resonator and the second optical ring resonator;
   a second output;
   a third optical ring resonator selectively coupling a second optical channel from the on-chip optical waveguide to the second output; and
   an optical pump source optically coupled to the intermediate waveguide.

2. The integrated circuit of claim 1 wherein:
   the first optical ring resonator is a first tunable optical ring resonator selectively tunable to couple either of the first optical channel or the second optical channel from the on-chip optical waveguide to the first output; and
   the third optical ring resonator is a second tunable optical ring resonator selectively tunable to couple either of the first optical channel or the second optical channel from the on-chip optical waveguide to the second output.

3. The integrated circuit of claim 2 further comprising a tune control circuit wherein a first tune signal is coupled from the tune control circuit to the first tunable optical ring resonator so as to couple an optical channel from the on-chip optical waveguide to the first output.

4. The integrated circuit of claim 1 wherein the first optical channel is a first optical clock signal of a field-programmable gate array and the first output, first optical ring resonator, intermediate waveguide, second optical ring resonator, second output, and third optical ring resonator form an optical crossbar.

5. The integrated circuit of claim 4 further comprising:
   an optical detector, wherein the first optical clock signal is coupled from the optical crossbar to the optical detector.

6. The integrated circuit of claim 5 wherein the second optical channel is a second optical clock signal and further comprising:
   a second optical detector coupled to the second optical clock signal converting the second optical clock signal to a second electrical clock signal; and
   a second block, the second electrical clock signal being provided to the second block.

7. The integrated circuit of claim 5 further comprising a block, wherein the optical detector converts the first optical clock signal to a first electrical clock signal to be provided to the block.

8. The integrated circuit of claim 7 wherein the block comprises complementary metal-oxide-semiconductor circuitry.

9. The integrated circuit of claim 7 wherein the block comprises a transceiver.

10. The integrated circuit of claim 4 further comprising:
    a second optical crossbar, wherein the first optical clock signal is coupled from the optical crossbar to the second optical crossbar.

11. The integrated circuit of claim 4 further comprising an optical interface, wherein the first optical clock signal is coupled from the optical crossbar to the optical interface.

12. The integrated circuit of claim 1 further comprising an optical clock generator.

13. A method of routing optical channels through an optical crossbar switch comprising:
    providing a plurality of optical signals on a plurality of optical channels to an on-chip optical waveguide;
    applying a first free carrier tuning signal to a first optical ring resonator so as to couple a first optical signal of the plurality of optical signals to a first output port of an optical crossbar switch;
    applying a second tuning signal to a second optical ring resonator so as to couple a second optical signal of the plurality of optical signals to a second output port of the optical crossbar switch; and injecting light into a waveguide coupled to at least one of the first and second optical ring resonators.

14. The method of claim 13 further comprising steps of:
applying the first free carrier tuning signal to a third optical ring resonator disposed between the first optical ring resonator and the first output so as to couple the first optical signal through the first optical ring resonator and the third optical ring resonator to the first output.

15. The method of claim 13 further comprising steps of:
applying a third tuning signal to a third optical ring resonator disposed between the first optical ring resonator and the first optical output so as isolate the first optical output from any optical signal on the on-chip optical waveguide.

16. The method of claim 13 further comprising steps of:
applying a third tuning signal to the first optical ring resonator; and
applying a fourth tuning signal to a third optical ring resonator disposed between the first optical ring resonator and the first output so as isolate the first output from any optical signal on the on-chip optical waveguide.

17. The method of claim 13 wherein the second tuning signal is a second free carrier tuning signal.

18. The method of claim 13 wherein at least one of the plurality of optical signals is an optical clock signal.

* * * * *